United States Patent [19]

Mazzoni

[11] Patent Number: 4,510,110
[45] Date of Patent: Apr. 9, 1985

[54] HIGH EFFICIENCY, FAST EXTRUDERS FOR EXTRUDING AND REFINING SOAP AND DETERGENTS

[75] Inventor: Aldo Mazzoni, Busto Arsizio, Italy

[73] Assignee: Costruzioni Meccaniche G. Mazzoni S.p.A., Busto Arsizio, Italy

[21] Appl. No.: 536,667

[22] Filed: Sep. 28, 1983

Related U.S. Application Data

[62] Division of Ser. No. 306,669, Sep. 29, 1981, abandoned.

[30] Foreign Application Priority Data

Sep. 30, 1980 [IT]  Italy ............................... 25032 A/80

[51] Int. Cl.³ ................................................ B29F 3/02
[52] U.S. Cl. ................................ 264/176 R; 264/330; 366/79; 366/87; 425/197; 425/208
[58] Field of Search ................... 264/176 R, 330, 349; 425/208, 209, 379 R, 203, 376 R, 202, 197, 198; 366/79, 87

[56] References Cited

U.S. PATENT DOCUMENTS

| | | | |
|---|---|---|---|
| 1,312,424 | 8/1919 | Richardson | 264/176 R |
| 1,320,128 | 10/1919 | Felix | 366/87 |
| 2,135,325 | 11/1938 | Burt et al. | 425/197 |
| 2,213,772 | 9/1940 | Strain | 425/376 R |
| 2,414,097 | 1/1947 | Garvey et al. | 264/176 R |
| 3,145,420 | 8/1964 | Joukainen et al. | 425/376 R |
| 3,541,652 | 11/1970 | Fischer | 425/379 R |
| 3,676,538 | 7/1972 | Patterson | 264/75 |
| 4,100,618 | 7/1978 | Fischer | 366/297 |
| 4,118,164 | 10/1978 | Wenger et al. | 425/202 |
| 4,125,333 | 11/1978 | Fields | 366/79 |

FOREIGN PATENT DOCUMENTS

| | | | |
|---|---|---|---|
| 1529762 | 3/1970 | Fed. Rep. of Germany . | |
| 1679816 | 3/1971 | Fed. Rep. of Germany . | |
| 2461453 | 7/1975 | Fed. Rep. of Germany | 425/208 |
| 55-113540 | 9/1980 | Japan | 425/208 |
| 1191721 | 5/1970 | United Kingdom . | |

Primary Examiner—Jeffery Thurlow
Attorney, Agent, or Firm—Young & Thompson

[57] ABSTRACT

A method for extruding and/or refining soap, which comprises supplying soap to one end of a helix disposed in a casing and rotating the helix to move the soap lengthwise along the casing and out of the casing. The helix rotates at a speed between 20 and 50 rpm. The length of the helix is 5 to 15 times its diameter. The winding angle of the helix is between 15° and 25°. The helix has a diameter of about 150 mm and a helix depth between 30 and 35 mm.

4 Claims, 4 Drawing Figures

U.S. Patent   Apr. 9, 1985   4,510,110
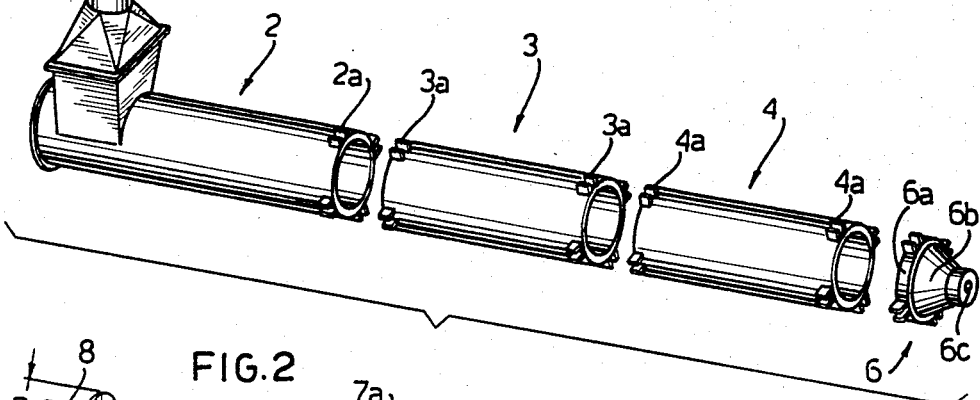
FIG.1
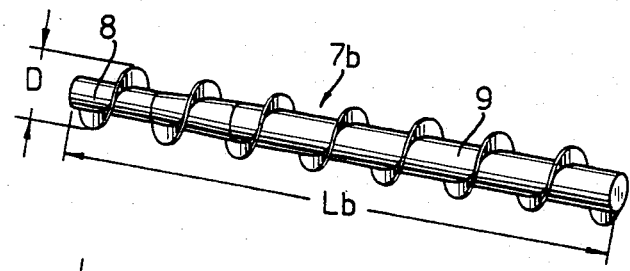
FIG.2
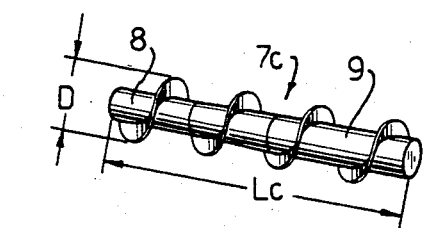
FIG.3
FIG.4

HIGH EFFICIENCY, FAST EXTRUDERS FOR EXTRUDING AND REFINING SOAP AND DETERGENTS

This application is a division of application Ser. No. 306,669, filed 9/29/81 now abandoned.

This invention relates to a method of conducting soap extruding and/or refining operations.

Extrusion and refining of soap is provided by a rotating screw comprised in a static container. The product is compressed and caused to exit from the extruding or refining unit in the form of bars, pellets, string-like elements, etc.

In order to avoid the overheating of the soap, the static container is cooled.

Extruders at present used in continuous extrusion of soap, have a helix rotating at low speed, that is at 10–20 r.p.m., preferably 15 r.p.m.

The winding angle of the helix is 8°–12°.

Its ratio length/diameter is 2.5 to 3.5.

The already known helix diameters are in the range of 300 to 350 mm.

These machines are very big, which results in considerable cost, substantial overall size and great weight of the machine. The slowly rotating helix suffers from the disadvantages of providing low outputs and requiring massive reduction gears between motor and helix.

This also involves remarkable dwell times of the product in the machine, resulting in a much too long mechanical processing time of the product.

It is the object of the present invention to overcome the above described disadvantages in the present machines by providing the same production or output with smaller and less expensive machines.

The above specified object has been accomplished by providing a method using an extruder in which the extruding member is fitted with a helix rotating at a speed in the range of between 20 to 50 r.p.m., the screw diameter being in the range of 100–200 mm and its length in the range of 5 to 15 times its diameter.

A preferred approach also provides that the speed is maintained at about 35 r.p.m., with a diameter of 150 mm and a length of 10 times the diameter.

Preferably, the winding angle of the helix is also maintained at 20°.

A particular embodiment further provides that the helix length ranging, between 5 and 15 times the diameter, may be varied within this range, thus correspondingly modifying the dwell times for the product within the machine.

The invention will now be further described with reference to an exemplary embodiment which has been shown in FIGS. 1 to 4 of the accompanying drawing showing exploded longitudinal views of an extruder.

An extruder for practicing a method according to the present invention comprises a loading hopper 1, with or without screw feeder, a series of cooled cylinder sections 2, 3 and 4, a refining unit 5 and/or extruding unit 6 which is heated, a helix 7a, 7b, 7c of different length depending on the number of cylinders used.

The loading hopper 1 is provided also for operating under vacuum.

The cylinder sections 2, 3 and 4 join together so as to allow the variation of the screw length. The free end 2a of cylinder 2, and both ends 3a and 4a of cylinders 3 and 4, as well as the connecting flange 5a and 6a of the extruding and refining units are provided with members for mutual fastening, so that each helix 7a, 7b, 7c can be inserted therein.

The dwell time of the product may vary for each arrangement.

The product outlet units may be formed of refining units 5 comprising screens and perforated plates and/or bar extruding units 6 comprising a conical connector 6b and an extruding outlet 6c. Both units may be heated.

The helix is provided with a compression portion under the hopper which is also partially inserted in the cylinder, that is an initial length of the helix has a conical core 8 extending under the loading hopper and partly into the cylinder section; in the remaining part of cylinder sections 2, 3 and 4 the helix core 9 has a constant diameter.

As above mentioned, the length La, Lb, Lc of the helix is in any case at least 5 times to 15 times the diameter D, but preferably 10 times said diameter D.

The speed of rotation of the helix ranges between 20 and 50 r.p.m., but preferably is about 35 r.p.m.

The winding angle of the helix ranges between 15° and 25° but preferably is 20°.

The depth of the helix thread ranges between 20 to 45 mm, but preferably between 30 and 35 mm.

What I claim is:

1. In a method of making soap, comprising supplying soap to one end of a helix disposed in a casing, and rotating the helix to move the soap lengthwise along the casing and out of the casing; the improvement comprising rotating the helix at a speed between 20 and 50 rpm, providing the length of the helix between 5 to 15 times its diameter, providing a winding angle for the helix between 15° and 25°, providing the helix diameter between about 150 mm, and providing the depth of the helix between 30 and 35 mm.

2. A method as claimed in claim 1, in which said winding angle is about 20°.

3. A method as claimed in claim 1, in which said helix length is about 10 times it diameter.

4. A method as claimed in claim 1, in which said helix speed is about 35 rpm.

* * * * *